United States Patent [19]
Yoshikawa et al.

[11] Patent Number: 5,129,784
[45] Date of Patent: Jul. 14, 1992

[54] CERAMIC ROTOR AND METAL SHAFT ASSEMBLY

[75] Inventors: Takaya Yoshikawa; Noboru Ishida, both of Aichi, Japan

[73] Assignee: NGK Spark Plug Co., Ltd., Nagoya, Japan

[21] Appl. No.: 745,909

[22] Filed: Aug. 15, 1991

[30] Foreign Application Priority Data

Aug. 23, 1990 [JP] Japan .................................. 2-223195

[51] Int. Cl.$^5$ .............................................. F04D 29/04
[52] U.S. Cl. .................................. 415/216.1; 403/30
[58] Field of Search ................ 415/216.1; 416/241 B; 403/29, 30, 41, 179, 273; 417/407

[56] References Cited

U.S. PATENT DOCUMENTS

| | | |
|---|---|---|
| 4,557,704 | 12/1985 | Ito et al. ............................ 415/216.1 |
| 4,639,194 | 1/1987 | Bell, III et al. .................... 415/216.1 |
| 4,784,574 | 11/1988 | Tsuno et al. ...................... 415/216.1 |

Primary Examiner—John T. Kwon
Attorney, Agent, or Firm—Foley & Lardner

[57] ABSTRACT

In a ceramic rotor and metal shaft assembly, a ceramic rotor has a protruded portion and is joined at the protruded portion to a recessed portion of a metal shaft by shrinkage fit or the like fitting method of fixedly holding the protruded and recessed portions relative to each other by making the mating circumferential surfaces of the protruded and recessed portions pressed against each other. The recessed portion has a minimum thickness wall between a circumferential wall and a bottom wall. The protruded and recessed portions have a set relationship of $$0.05 \leq t/d \leq 0.2$$

where t is a thickness of the minimum wall portion of the recessed portion and D is an outer diameter of the protruded portion.

9 Claims, 2 Drawing Sheets

CERAMIC ROTOR AND METAL SHAFT ASSEMBLY

BACKGROUND OF THE INVENTION

1. Field of the Invention

The present invention relates in general to a ceramic rotor and metal shaft assembly for use in turbochargers, gas turbines, etc. and more particularly to a ceramic rotor and metal shaft assembly of the kind that the ceramic rotor and metal shaft are joined together at their protruded and recessed portions by making the recessed portion tightly or firmly hold the protruded portion.

2. Description of the Prior Art

The use of a ceramic turbine wheel in a turbocharger with a view to improving the responsiveness is well known in the art. The shaft for supporting the ceramic turbine wheel is made of metal, and the ceramic turbine wheel and the metal shaft are joined by for example shrinkage fit. The shrinkage fit is a method of joining a protruded portion of the turbine wheel to a recessed portion of the shaft by heating the recessed portion up to a predetermined high temperature and then coupling the protruded and recessed portions together so that by the effect of shrinkage of the recessed portion when cooled the protruded and recessed portions are firmly joined together.

For the purpose of attaining shrinkage fit, the coefficient of thermal expansion of the recessed portion made of metal is set larger than that of the protruded portion made of ceramics. Due to this, after shrinkage fit, tensile stress arises at the joint between the recessed and protruded portions, thus lowering the strength of the joint between the turbine wheel and metal shaft.

When the strength of the joint between the turbine wheel and shaft is lowered, a variation of the rotational balance of the turbine wheel may possibly be caused after a long period of usage.

In order to overcome this problem, it has heretofore been practiced to provide a groove to the outer periphery of the recessed portion. This however causes a large design restriction.

To the same end, it is also known to provide between the recessed and protruded portions a brazing metal which serves as a buffer member. However, due to the necessities of a plating process for attaining uniform formation of a brazing metal on the inner circumferential surface of the recessed portion and the outer circumferential surface of the protruded portion, a process of removing unnecessary plating, etc., a high manufacturing cost results.

It has further been proposed to provide a clearance between the bottom surface of the recessed portion and the axial end of the protruded portion. This however is encountered by another problem that it is difficult to control variation of the clearance from product to product within a predetermined allowance.

SUMMARY OF THE INVENTION

In accordance with the present invention, there is provided a novel and improved ceramic rotor and metal shaft assembly which comprises a ceramic rotor having a concentric protruded portion at an axial end, and a metal shaft having a recessed portion at an axial end and joined to the ceramic rotor by making mating circumferential surfaces of the protruded and recessed portions pressed against each other and thereby making the protruded portion fixedly held within the recessed portion.

The above structure may follow the conventional fashion.

In accordance with the present invention, the recessed portion has a minimum thickness wall portion adjacent a bottom corner thereof, and the protruded portion and the recessed portion have a set relationship of $$0.05 \leq t/D \leq 0.2$$

where D is an outer diameter of the protruded portion and t is a thickness of the minimum thickness wall portion.

This structure can solve the above noted problems inherent in the prior art device.

It is accordingly an object of the present invention to provide a novel and improved ceramic rotor and metal shaft assembly which can attain a large strength at the joint between the ceramic rotor and metal shaft.

It is a further object of the present invention to provide a novel and improved ceramic rotor and metal shaft assembly of the above described character which can maintain a rotational balance even after a long period of usage.

It is a further object of the present invention to provide a novel and improved ceramic rotor and metal shaft assembly of the above described character which makes it possible to execute its design and manufacture with ease and therefore makes it possible to reduce the manufacturing cost.

It is a further object of the present invention to provide a novel and improved ceramic rotor and metal shaft assembly of the above described character which is practically so useful though so simple in structure.

DETAILED DESCRIPTION OF THE PREFERRED EMBODIMENTS

Figure 1:
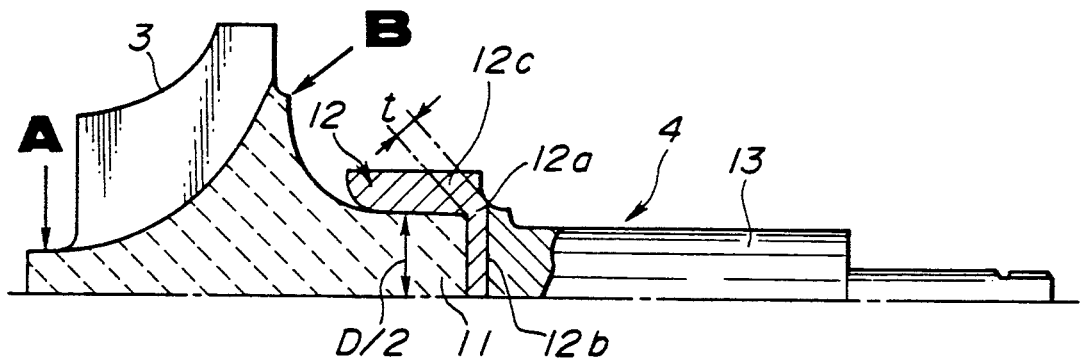
FIG. 1 shows a sectional view of a ceramic rotor and metal shaft assembly according to an embodiment of the present invention.
Figure 2:
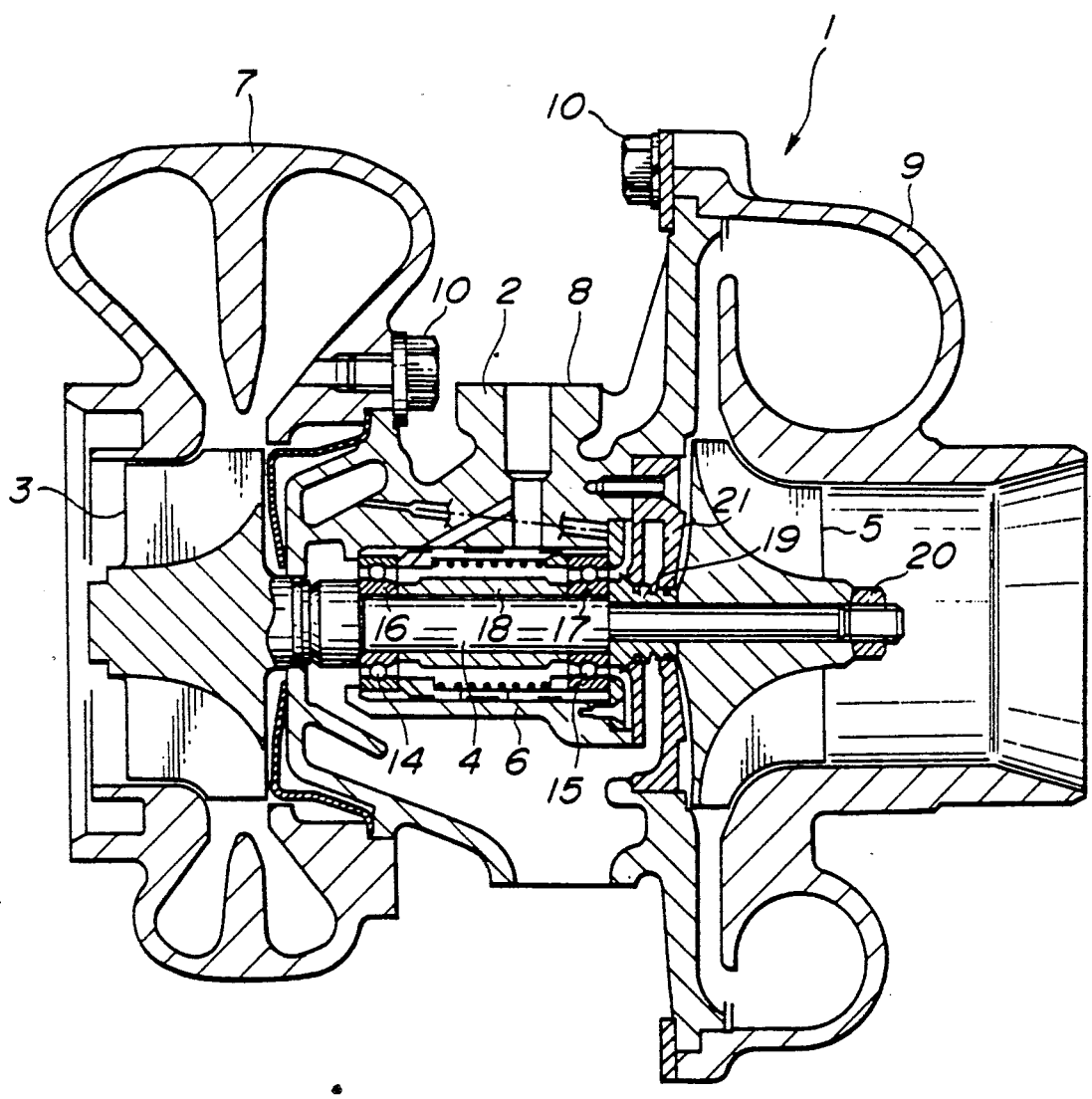
FIG. 2 is a sectional view of a turbocharger in which the ceramic rotor and metal shaft assembly of FIG. 1 is incorporated.

Referring to FIGS. 1 and 2, a turbocharger is generally indicated by the reference numeral 1 and shown as including a housing 2, a turbine wheel or rotor 3, a shaft 4 joined to the turbine wheel 3, a compressor 5 secured to the shaft 4, and a support 6 for rotatably supporting the shaft 4 within the housing 2.

The housing 2 consists of three separate members, i.e., a turbine casing 7 forming an exhaust scroll, an intermediate casing 8 for receiving therewithin the support 6 and a compressor casing 9 forming an intake scroll, which casings are fastened together with a plurality of bolts 10.

The turbine wheel or rotor 3 is made of ceramics mainly containing silicon nitride (coefficient of thermal expansion is $2.2 \times 10^{-6}/°$ C.) for instance and has at an axial end a concentric protruded portion 11 to be joined with the shaft 4.

The shaft 4 is made of metal and has at an axial end a concentric recessed portion 12 which is joined with the protruded portion 11 of the turbine wheel 3 by tightly or firmly holding the protruded portion 11 of the turbine wheel 3. That is, the protruded portion 11 and the recessed portion 12 are joined together by being strongly pressed against each other. In this embodiment, this joining is by way of example attained by shrinkage fit. Further, the recessed portion 12 in this embodiment is made of incoloy (coefficient of thermal expansion is $9.4 \times 10^{-6}/°$ C.) and is joined to the journal portion 13 made of chromium-molybdenum steel or nickel-chromium-molybdenum steel by electron beam welding or friction welding.

The shrinkage fit will be described more in detail. The inner diameter of the recessed portion 12 is sized to be smaller by 40 to 50 μm than the outer diameter D of the protruded portion 11. The recessed portion 12 is heated to expand and receives therewithin the protruded portion 11. After the protruded portion 11 and recessed portion 12 are coupled together, they are allowed to be cooled. As the temperature of the recessed portion 12 falls, the protruded portion 11 and the recessed portion 12 are tightly or firmly joined together by the effect of thermal shrinkage.

The support 6 is provided with two ball bearings 14 and 15. A sleeve 18 is disposed between inner races 16 and 17 of the two ball bearings 14 and 15 for providing a predetermined distance between the two inner races 16 and 17.

The compressor wheel 5 made of aluminium for instance is installed on the shaft 4 by way of an inner oil seal 19 and secured thereto with a nut 20 which is screwed onto an end portion of the shaft 4. That is, by tightening the nut 20, the two inner races 16 and 17, sleeve 18, inner oil seal 19 and compressor wheel 5 are clamped or sandwiched between the recessed portion 12 and the nut 20 for thereby allowing the compressor wheel 5 to be secured to the shaft 4. In the meantime, the inner oil seal 19 is the pair to an outer oil seal 21 for preventing flow of lube oil into the compressor casing 9.

The recessed portion 12 of the shaft 4 will be described more in detail.

The recessed portion 12 has a channel-shaped or U-like cross section and includes a bottom wall 12b and a circumferential wall 12c. Between the bottom wall 12b and the circumferential wall 12c, the recessed portion 12 has a corner wall 12a which is minimum in thickness. The thickness t of the minimum thickness corner wall 12a of the recessed portion 12 is determined on the basis of the outer diameter D of the protruded portion 11 and is set according to the present invention so as to satisfy the following expression:

$0.05 \leq t/D \leq 0.2$

With the foregoing structure, the inner circumference of the recessed portion 12 is strongly pressed against the outer circumference of the protruded portion 11 when the protruded portion 11 and the recessed portion 12 are joined together. In this connection, when a temperature variation causes the recessed portion 12 to shrink or the protruded portion 11 to expand, the axial end of the protruded portion 11 is pressed against the bottom wall 12b of the recessed portion 12, thus causing the recessed portion 12 to be stretched with the corner wall 12a being serving as a support point.

For this reason, when the minimum thickness t and the outer diameter D is set to attain the relationship of $t/D \leq 0.2$, the recessed portion 12 can deform with ease, thus making it possible to reduce the resulting tensile stress at the joint between the recessed portion and protruded portion. As a result, by shrinkage fit of the protruded and recessed portions 11 and 12 it becomes possible to attain a large joint strength.

However, when the minimum thickness t becomes too thin relative to the outer diameter D, the strength of the recessed portion 12 for holding the protruded portion 11 is lowered, thus causing the rigidity at the joint of the assembly to be lowered. For this reason, by setting the minimum thickness t and the outer diameter D to a relation of $0.05 \leq t/D$, it becomes possible to attain a sufficient strength for supporting the protruded portion 11.

Tests for examining the joint strength of the ceramic rotor and metal shaft assembly were conducted by making different the thickness t of the corner wall 12a of the recessed portion 12 and the outer diameter D of the protruded portion 11.

Test articles used for a first test are of such a kind that the recessed portion 12 is made of incoloy 903 (heat resisting steel according to Japanese Industrial Standards), the journal portion 13 is made of SNCM-439 (nickel-chromium-molybdenum steel according to Japanese Industrial Standards), which portions are joined together by friction welding, and the protruded portion 11 and the recessed portion 12, after the inside surface of the recessed portion 12 is processed to become smooth, are subjected to aging treatment by holding them at 720° C. for eight hours and at 620° C. for eight hours, then coupled together at 600° C. and cooled in the atmosphere for shrinkage fit. The test articles are sized to be 10 mm and 12 mm in the outer diameter of the protruded portion 11, and the inner diameter of the recessed portion 12 is 40 μm smaller than the outer diameter D of the protruded portion 11 when the outer diameter D is 10 mm and 50 μm smaller when the outer diameter D is 12 mm. The test was executed by repeating 40 times a cycle of heating and cooling between −20° C. and 300° C. and then applying a load on the head portion (the portion indicated by the arrow A in FIG. 1) of the turbine wheel 3 while supporting the journal portion 13 for thereby measuring the strength of the joint by shrinkage fit. The test result is shown in Table 1.

TABLE 1

| No. | Outer Dia. (mm) | Minimum Thickness t (mm) | Bending Strength (Kg/mm$^2$) |
|---|---|---|---|
| 1 | 10 | 0.6 | 41 |
| 2 | 10 | 1.2 | 44 |
| 3 | 10 | 2.5 | 20 |
| 4 | 10 | 3.5 | 10 |
| 5 | 12 | 0.6 | 40 |
| 6 | 12 | 1.2 | 42 |
| 7 | 12 | 2.0 | 30 |
| 8 | 12 | 2.5 | 15 |

The method of measuring the bending strength in Table 1 will be described hereinafter. Under the condition of strongly holding the journal portion 13, a load directed perpendicularly to the axis of the shaft 4 is applied to the head portion of the turbine wheel 3 (refer to the arrow "A" in FIG. 1). When a fracture or breakage is caused at the joint between the protruded portion 11 and the recessed portion 12, the bending stress having been caused at the joint at this moment of breakage is considered as the bending strength.

Test articles used for a second test are of such a kind that the recessed portion 12 is made of incoloy 903 (heat resisting steel according to Japanese Industrial Standards), subjected to aging treatment by being held at 720° C. for eight hours and at 620° C. for eight hours and joined with the protruded portion 11 by shrinkage fit, that the journal portion 13 is made of SCM-440 (chromium-molybdenum steel according to Japanese Industrial Standards), subjected to thermal refining and joined to the recessed portion 12 by electron beam welding, and that the journal portion 13 is hardened higher than HRC 50. In the meantime, the turbine wheel 3 used in the test is sized to be 50 mm of outer diameter.

The second test was executed by repeating for five hours a cycle of operating the engine for idle for five minutes, then operating the engine at 2,500 rpm while subjecting it to 50% of full loading and then to full loading, to examine a variation of the balance after the test. The test result is shown in Table 2.

TABLE 2

| No. | Outer Dia. (mm) | Maximum Thickness (t) | Before Test (Head Portion/Back Plate portion) (mg. mm) | After Test |
| --- | --- | --- | --- | --- |
| 1 | 10 | 0.5 | 10/21 | 132/188 |
| 2 | 10 | 0.8 | 8/15 | 32/53 |
| 3 | 10 | 1.2 | 12/30 | 16/36 |
| 4 | 10 | 1.5 | 6/8 | 12/30 |
| 5 | 12 | 0.4 | 8/21 | 163/273 |
| 6 | 12 | 0.6 | 16/23 | 96/165 |
| 7 | 12 | 1.0 | 10/36 | 32/75 |
| 8 | 12 | 1.5 | 13/26 | 18/45 |

The variation of balance shown in FIG. 2 was measured in the following manner. Firstly, before executing the test, the assembly of the turbine wheel 3 and shaft 4 is rotated and cut at a head portion indicated by the arrow "A" in FIG. 1 and at a back plate portion indicated by the arrow "B" to be balanced. Then, the durability test was executed and thereafter the balance was measured.

As shown in Table 1, when $t/D \leq 0.2$, the joint strength between the protruded portion 11 and the recessed portion 12 is high, whereas when $t/D > 0.2$ the joint strength becomes lower due to the tensile stress. Further, as shown in Table 2, when $0.05 \leq t/D$, the variation of balance after the test is small, and when $t/D < 0.05$ the variation of the balance becomes larger due to the reduction of the strength of the recessed portion 12.

From the foregoing, it will be understood that by constructing the assembly of the ceramic rotor 3 and metal shaft 4 to satisfy the expression $0.05 \leq t/D \leq 0.2$, the turbine wheel 3 and the shaft 4 are joined together strongly, thus making it possible to suppress a variation of the rotational balance of the turbine wheel 3 even after a long period of usage.

It will be further understood that the present invention makes it possible to strongly join the turbine wheel 3 and the shaft 4 by means of a simple structure for setting, depending upon the outer diameter D of the protruded portion 11, the thickness t of the minimum thickness wall 12a of the recessed portion 12 within a suitable range. As a result, it becomes possible to attain the design and manufacture easier than before, thus making it possible to reduce the cost.

While the present invention has been described and shown as joining the protruded portion and recessed portion by shrinkage fit by cooling from a high temperature, it is not limited to be so. For example, the protruded portion and recessed portion may be joined by shrinkage fit by temperature variation from a sub-zero temperature, press fit, or a joining method of pouring a mass of molten brazing metal into a space between the recessed and protruded portions which are heated up to a high temperature and cooling them so that the recessed portion tightly or firmly holding the protruded portion by way of the brazing metal.

Figure 3:
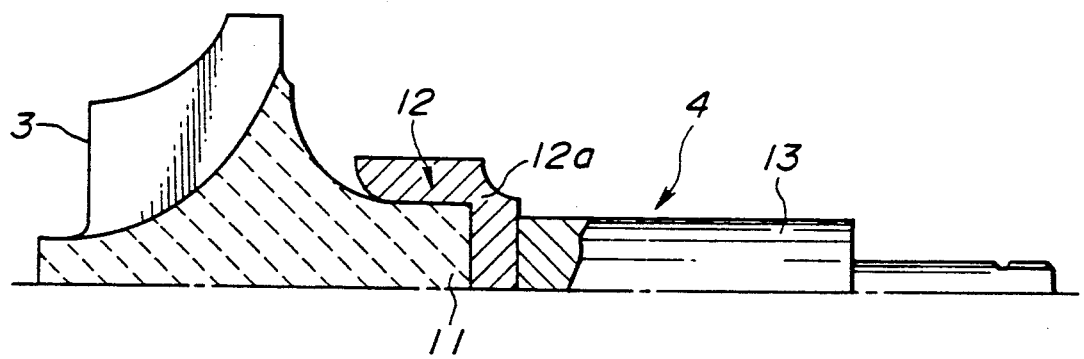
FIG. 3 is a view similar to FIG. 1 but shows a variant of the ceramic rotor and metal shaft assembly of FIG. 1.

Further, the joint portion of the shaft 4 at which two kinds of metals join, is not limited to the above described embodiment. For example, the joining may be attained at a different place such as shown in FIG. 3. Further, the recessed portion 12 and the journal portion 13 may be made of the same metal.

Further, while the ceramic rotor and metal shaft assembly of the present invention has been described and shown as being a rotor for a turbocharger, it may be a rotor for other devices such as a gas turbine.

What is claimed is;

1. A ceramic rotor and metal shaft assembly comprising:
   a ceramic rotor having a concentric protruded portion at an axial end; and
   a metal shaft having a recessed portion at an axial end and joined to said ceramic rotor by making mating circumferential surfaces of said protruded and recessed portions pressed against each other and thereby making said protruded portion fixedly held within said recessed portion;
   in which said recessed portion has a minimum thickness wall portion adjacent a bottom corner thereof;
   in which said protruded portion and said recessed portion have a set relationship of $$0.05 \leq t/D \leq 0.2$$

where D is an outer diameter of said protruded portion and t is a thickness of said minimum thickness wall portion.

2. A ceramic rotor and metal shaft assembly according to claim 1, wherein said recessed portion has a U-like cross section and includes a circumferential wall and a bottom wall, said minimum thickness wall portion being located between said circumferential wall and said bottom wall.

3. A ceramic rotor and metal shaft assembly according to claim 2, wherein said protruded portion of said ceramic rotor and said recessed portion of said shaft are joined by shrinkage fit.

4. A ceramic rotor and metal shaft assembly according to claim 1, wherein said protruded portion of said ceramic rotor and said recessed portion of said shaft are joined by press fit.

5. A ceramic rotor and metal shaft assembly according to claim 1, wherein said metal shaft further comprises another shaft portion joined to said recessed portion by welding.

6. A ceramic rotor and metal shaft assembly according to claim 4, wherein said welding is electron beam welding.

7. A ceramic rotor and metal shaft assembly according to claim 4, wherein said welding is friction welding.

8. A ceramic rotor and metal shaft assembly according to claim 1, wherein said ceramics forming said rotor mainly contains silicon nitride, said metal forming said recessed portion is incoloy and said metal forming other shaft portion is chromium-molybdenum steel.

9. A ceramic rotor and metal shaft assembly according to claim 1, wherein said ceramics forming said rotor mainly contains silicon nitride, said metal forming said recessed portion is incoloy and said metal forming other shaft portion is nickel-chromium-molybdenum steel.

* * * * *